United States Patent
Simons et al.

(10) Patent No.: US 12,240,293 B2
(45) Date of Patent: Mar. 4, 2025

(54) CONNECTED CAR CLIMATE CONTROL INTEGRATION AND AUTOMATION

(71) Applicant: Alarm.com Incorporated, Tysons, VA (US)

(72) Inventors: Samuel Simons, Reston, VA (US); William Mensah, Fairfax, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/865,467

(22) Filed: Jul. 15, 2022

(65) Prior Publication Data

US 2022/0348055 A1 Nov. 3, 2022

Related U.S. Application Data

(63) Continuation of application No. 16/674,765, filed on Nov. 5, 2019, now Pat. No. 11,390,140.

(60) Provisional application No. 62/757,912, filed on Nov. 9, 2018.

(51) Int. Cl.
*B60H 1/00* (2006.01)
*F24F 11/58* (2018.01)
*F24F 120/10* (2018.01)

(52) U.S. Cl.
CPC ..... *B60H 1/00657* (2013.01); *B60H 1/00742* (2013.01); *B60H 1/00771* (2013.01); *B60H 1/00971* (2013.01); *F24F 11/58* (2018.01); *F24F 2120/10* (2018.01)

(58) Field of Classification Search
CPC ............ B60H 1/00657; B60H 1/00742; B60H 1/00771; B60H 1/00971; F24F 11/58; F24F 2120/10; F24F 11/63
See application file for complete search history.

(56) References Cited

U.S. PATENT DOCUMENTS

| | | | |
|---|---|---|---|
| 5,729,989 A | 3/1998 | Sunaga et al. | |
| 9,783,024 B2 | 10/2017 | Connell et al. | |
| 9,963,012 B2 * | 5/2018 | Stevanovic | ........ B60H 1/00971 |
| 10,315,663 B2 * | 6/2019 | Dudar | ............... B60W 50/0098 |
| 10,642,256 B2 * | 5/2020 | Rocci | ................. B60H 1/00771 |
| 10,731,882 B2 * | 8/2020 | Abrishamkar | ........... F24F 11/30 |
| 10,907,844 B2 * | 2/2021 | Ribbich | ............. G05D 23/1902 |
| 10,974,567 B2 * | 4/2021 | Ostrowski | ............... G06N 5/01 |
| 11,009,248 B2 * | 5/2021 | Salem | ..................... F24F 11/56 |

(Continued)

*Primary Examiner* — Aniss Chad
*Assistant Examiner* — Christopher George Fees
(74) *Attorney, Agent, or Firm* — Fish & Richardson P.C.

(57) ABSTRACT

Methods, and systems including computer programs encoded on a computer storage medium, for automated climate control. In one aspect, a monitoring system includes an indoor climate control device that is configured to adjust an indoor climate setting of a property, a sensor that is located at the property and configured to generate sensor data that reflects an attribute of the property, and a monitor control unit. The monitor control unit is configured to receive the sensor data, and receive, from an onboard control unit for a first vehicle associated with the property, data that reflects a status of the first vehicle. Based on the data that reflects the status of the first vehicle and the sensor data, the monitor control unit determines the indoor climate setting for the indoor climate control device, and provides instructions to adjust the indoor climate control device to the indoor climate setting.

20 Claims, 5 Drawing Sheets

(56) References Cited

U.S. PATENT DOCUMENTS

| | | |
|---|---|---|
| 11,014,428 B2 * | 5/2021 | Elson ................. B60H 1/00742 |
| 11,034,362 B2 * | 6/2021 | Rao ........................ G06V 40/70 |
| 11,255,567 B2 * | 2/2022 | Mowery ................. F24F 11/54 |
| 11,372,936 B2 * | 6/2022 | Ricci ...................... G06Q 50/40 |
| 11,393,261 B2 * | 7/2022 | Rafferty ................. G07C 5/008 |
| 11,516,630 B2 * | 11/2022 | Silverstein .............. G01S 13/42 |
| 2007/0144723 A1 | 6/2007 | Aubertin et al. |
| 2013/0306297 A1 | 11/2013 | Sebastian et al. |
| 2014/0229075 A1 | 8/2014 | Lopez |
| 2016/0193895 A1 * | 7/2016 | Aich ........................ F24F 11/56 |
| | | 236/1 C |
| 2017/0036511 A1 | 2/2017 | Lee et al. |
| 2017/0326944 A1 * | 11/2017 | Carlesimo .......... B60H 1/00878 |
| 2017/0349027 A1 * | 12/2017 | Goldman-Shenhar ....................... |
| | | B60H 1/00742 |
| 2018/0001734 A1 * | 1/2018 | Faust ................. B60H 1/00842 |
| 2018/0022182 A1 * | 1/2018 | Miller ................ B60H 1/00778 |
| | | 165/203 |
| 2018/0348740 A1 | 12/2018 | Rocci et al. |
| 2021/0348792 A1 * | 11/2021 | McPhail ................. F24F 11/49 |

* cited by examiner

CONNECTED CAR CLIMATE CONTROL INTEGRATION AND AUTOMATION

CROSS-REFERENCE TO RELATED APPLICATIONS

This application is a continuation of U.S. application Ser. No. 16/674,765, filed Nov. 5, 2019, which claims the benefit of U.S. application Ser. No. 62/757,912, filed Nov. 9, 2018. Both of these prior applications are incorporated by reference in their entirety

TECHNICAL FIELD

This disclosure relates generally to control systems, and more particularly to integrating and automating vehicle climate control.

BACKGROUND

A vehicle may include a climate control system that the driver can manually control. If the driver wants to adjust the temperature in the vehicle, then the driver manually interacts with the climate controls on the dashboard.

SUMMARY

Techniques are described for automating remote climate control for a vehicle based in part on climate control settings for a home HVAC system that is linked to the vehicle.

More specifically, techniques are described for using remote control of respective HVAC systems of a vehicle and a home to propagate a set of climate control settings experienced by a user between a user's vehicle and a user's home as the user transitions between vehicle and home. The set of climate control settings can incorporate user preferences and feedback, pattern recognition, tracking of user location for achieving ideal temperature conditions for the vehicle and home.

In general, one innovative aspect of the subject matter described in this specification can be embodied a monitoring system including an indoor climate control device that is configured to adjust an indoor climate setting of the property, a sensor that is located at the property and that is configured to generate sensor data that reflects an attribute of the property, and a monitor control unit. The monitor control unit is configured to receive the sensor data and receive, from an onboard control unit for a first vehicle associated with the property, data that reflects a status of the first vehicle. Based on the data that reflects the status of the first vehicle and the sensor data, the monitor control unit determines the indoor climate setting for the indoor climate control device and provides, to the indoor climate control device, instructions to adjust the indoor climate control device to the indoor climate setting. Other embodiments of this aspect include corresponding systems, apparatus, and computer programs, configured to perform the actions of the methods, encoded on computer storage devices.

These and other embodiments can each optionally include one or more of the following features. In some implementations, the status of the vehicle includes a location of the vehicle, and the monitor control unit is configured to determine that the location of the vehicle is within a predefined distance of the property, where the indoor climate setting for the indoor climate control device is based on determining that the location of the vehicle is within the predefined distance of the property.

In some implementations, the status of the vehicle includes a current set of climate control settings for the vehicle. The monitor control unit can be configured to determine the indoor climate setting for the indoor climate control device by adjusting the climate control settings for the vehicle by an adjustment factor. The adjustment factor can be based in part on one or more of a current weather, a current time of day, a temperature offset, a vehicle fan speed adjustment, and a make/model of the vehicle.

In some implementations, the monitor control unit is configured to receive, from the indoor climate control device, data indicating a user adjustment to the indoor climate setting after providing the instructions to adjust the indoor climate control device, and based on receiving the data indicating the user adjustment to the indoor climate setting after providing the instructions to adjust the indoor climate control device, modify the adjustment factor.

In some implementations, the monitor control unit is configured to determine a home occupancy level of the property based on the sensor data, and determine a vehicle occupancy level of the first vehicle based on the data that reflects the status of the first vehicle, where the indoor climate setting for the indoor climate control device is based on the home occupancy level and the vehicle occupancy level.

In some implementations, the monitor control unit is configured to receive, from a second onboard control unit for a second vehicle associated with the property and within a particular period of time from receiving the data that reflects the status of the first vehicle, data that reflects a status of the second vehicle, where indoor climate setting for the indoor climate control device is based on the data that reflects the status of the first vehicle and the status of the second vehicle. The monitor control unit can be configured to access a first user preference of a driver of the first vehicle and access a second user preference of the driver of the second vehicle, where the indoor climate setting for the indoor climate control device is based on the first user preference and the second user preference. The data that reflects the status of the first vehicle can include a climate control setting of the first vehicle, the data that reflects the status of the second vehicle can include a climate control setting of the second vehicle, and the indoor climate setting for the indoor climate control device is based on an average of the climate control setting of the first vehicle and the climate control setting of the second vehicle.

In some implementations, the monitor control unit is configured to determine a first distance between the property and the first vehicle based on the data that reflects the status of the first vehicle, and determine a second distance between the property and the second vehicle based on the data that reflects the status of the second vehicle, where the indoor climate setting for the indoor climate control device is based on the first distance and the second distance.

In some implementations, the monitor control unit is configured to determine that a resident of the property is departing the property and entering the first vehicle, determine a second indoor climate setting for the indoor climate control device for the property, determine a climate control setting for the first vehicle based on the second indoor climate setting for the indoor climate control device for the property, and provide, to the first vehicle, the climate control setting.

In some implementations, sensor data includes one or more of motion sensor data, electricity usage data, and camera data.

In general, another innovative aspect of the subject matter described in this specification can be embodied in methods including receiving, by a monitoring system that is configured to monitor a property, sensor data that reflects an attribute of the property, receiving, by the monitoring system and from an onboard control unit for a first vehicle associated with the property, data that reflects a status of the first vehicle, based on the data that reflects the status of the first vehicle and the sensor data, determining, by the monitoring system, an indoor climate setting for an indoor climate control device that is configured to adjust the indoor climate setting of the property, and providing, by the monitoring system and to the indoor climate control device, instructions to adjust the indoor climate control device to the indoor climate setting.

Implementations of the described techniques may include hardware, a method or process implemented at least partially in hardware, or a computer-readable storage medium encoded with executable instructions that, when executed by a processor, perform operations.

The techniques described in this disclosure provide one or more of the following advantages. By automatically setting vehicle climate control using climate control settings from a home, the driver of the vehicle does not have to manually make adjustments while driving which reduces driver distraction. Setting the vehicle climate control settings to reflect home climate control settings and/or driver preferences increases driver comfort by maintaining a climate-controlled environment that the driver experiences between home and their vehicle. Remotely setting and running a climate control program for the vehicle or home prior to user entry into the vehicle or home can improve energy efficiency and/or fuel efficiency and lower costs by ramping up to a preferred temperature rather than running the HVAC system on high. The system can additionally function as a backup regulator of climate control for a home HVAC system if a thermostat or other control (e.g., PID control) for a home HVAC system is determined to be unreliable.

A defrosting setting or auto-defrost setting for the vehicle can be integrated with the automated remote climate control to defrost or defog the vehicle's windshields on cold or humid days prior to the driver entering the vehicle. Additionally, an auto-defrost setting may monitor humidity in real-time and engage climate control settings that can reduce fog or humidity buildup on the windshield, improving the driver's view and ensuring a safer driving experience.

The details of one or more implementations are set forth in the accompanying drawings and the description below. Other features will be apparent from the description and drawings, and from the claims.

BRIEF DESCRIPTION OF THE DRAWINGS

Like reference numbers and designations in the various drawings indicate like elements.

DETAILED DESCRIPTION

Techniques are described for using remote control of respective HVAC systems of a vehicle and a home to propagate a set of climate control settings (e.g., ambient temperature setting, vent operation and positioning, fan speed, seat heating, opening/closing of windows, etc.) experienced by a user between a user's vehicle and a user's home as the user transitions between vehicle and home, and vice versa. The set of climate control settings can incorporate, for example, user preferences and feedback, pattern recognition, and tracking of user location, for achieving ideal climate control conditions for the vehicle and home.

Figure 1:
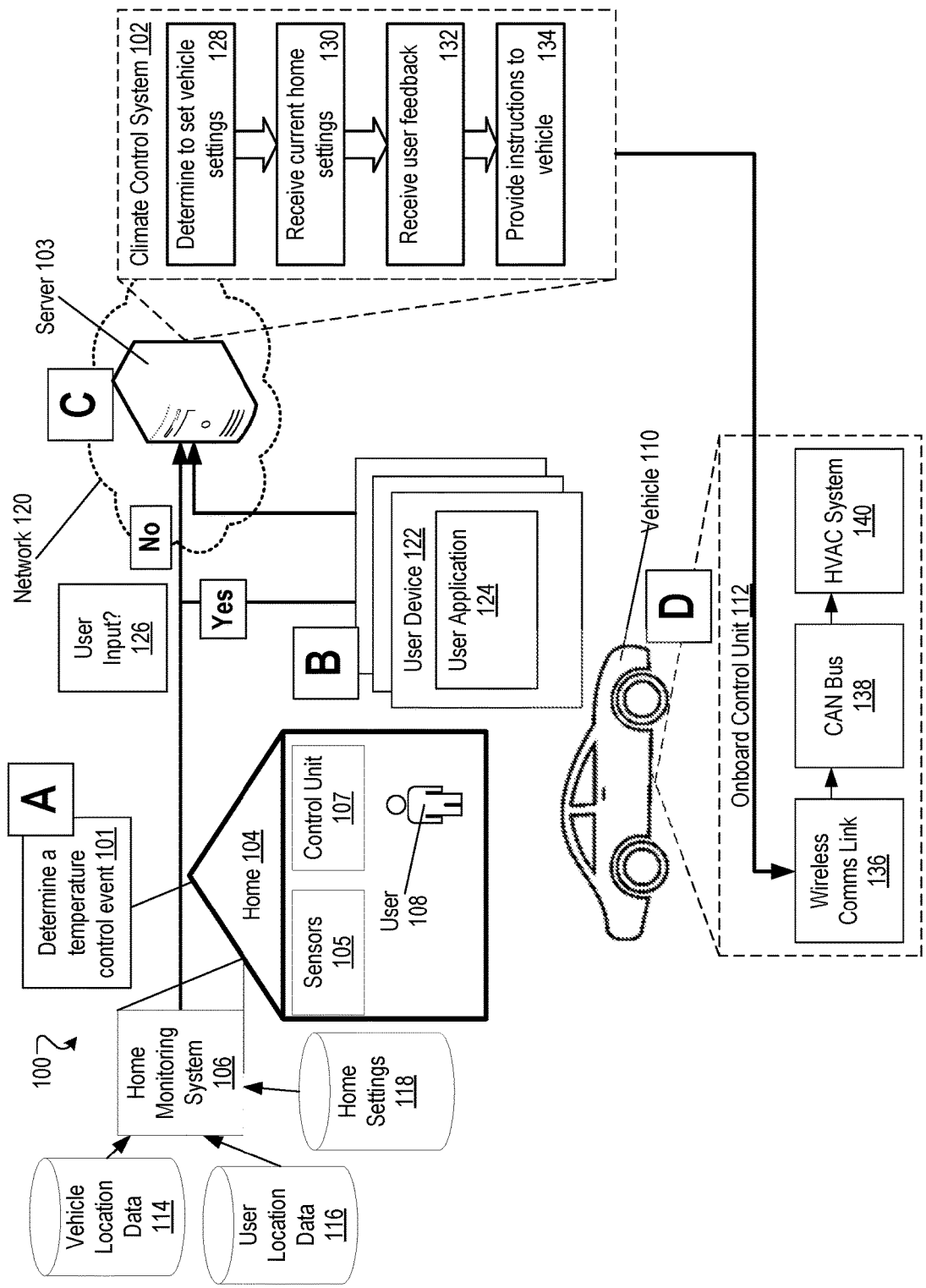
FIG. 1 is an example operating environment for a climate control system.

FIG. 1 is an example operating environment 100 for a climate control system 102. In FIG. 1 at stage (A) a climate control event 101 is determined at a home 104 that is equipped with a home monitoring system 106. The home monitoring system 106 and climate controls system 102 can be hosted on one or more local servers, a cloud-based service, or a combination of the two. In some implementations, the home monitoring system 106, the climate controls system 102, or a combination of the two systems can be hosted on one or more servers 103.

Home 104 can be, for example a residence (e.g., a single-family home, a town house, a condominium, property, or an apartment). In some implementations, a home 104 can be a commercial property (e.g., a business, government building, or a public space). Home 104 can have one or more users 108, where a user 108 can be, for example, a homeowner, a resident of the home 104, a visitor to the home 104, an employee of the home 104, or the like.

A home monitoring system 106 can include a set of sensors 105 and controllers located in or surrounding the home 104, including, for example, cameras, motion detectors, window/door sensors, and keypad access door locks. For example, cameras that capture video or still images of an area of the home 104 or motion detectors that sense movement in a region of the home 104.

The sensors may also include sensors 105 on an appliance that indicate usage of an appliance, for example, a sensor that indicates a coffeemaker or a stove is on. The sensors 105 may include utility sensors that detect resource usage, for example, an energy sensor that detects usage of electric power or a sensor that detects water usage. The sensors 105 may include microphones or other audio devices that detect audible sounds within the home 104. The sensors 105 may include temperature sensors, humidity sensors, airflow sensors, air quality detectors, or other sensors that monitor the climate or environment of an area of the home 104.

In some implementations, the sensors 105 may be related to controls of the home 104, e.g., an indoor climate control device that controls an indoor climate setting of the home 104. For example, a sensor may be integrated with the thermostat for the heating, ventilation, and air-conditioning (HVAC) system of the home 104. The sensor may report the current HVAC temperature setting, or the current temperature measured by the HVAC system.

In some implementations, the sensors 105 may detect and collect data related to the activity of the user 108 and/or one or more attributes of the home 104. For example, the sensors 105 may capture motion sensor data detecting movement about the home 104 or cameras may record video showing a user moving throughout the home 104. The appliance sensors may collect data indicating that a coffeemaker has been turned on, while water usage sensors may indicate that a shower of the home 104 is being used. A sensor integrated with the HVAC system may indicate that a temperature setting of a thermostat has changed. A motion sensor may indicate that the user 108 is in a particular room of the home 104. A door sensor may indicate that an entry to the home 104 was opened or closed. A keypad sensor may indicate that a particular resident's security code was used to lock or unlock a door, or change the status (e.g., arm, disarm) of the home monitoring system 106.

The home monitoring system 106 also includes a control unit 107. The sensors 105 communicate with the control unit 107, possibly through a network. Further details of the operation of the home monitoring system are discussed below with reference to FIG. 5.

Home 104 can have one or more associated vehicles 110, where an associated vehicle 110 can be, for example, owned or driven by user 108. Vehicle 110 can be a commercial or non-commercial vehicle, for example, a car, a truck, a bus, a flatbed, a trailer truck, or another piece of heavy machinery (e.g., a forklift, tractor, and backhoe) that is operated on a roadway. For example, a vehicle 110 can be a car belonging to a user 108. Vehicle 110 can include an onboard control unit 112 which can monitor and/or control various sensors (e.g., tire air pressure, engine temperature, throttle position, etc.), automatic transmission, anti-lock brakes, air bag deployment, keyless entry, climate control, motorized seats/mirrors, entertainment center (e.g., radio, MP3 player), cruise control, or the like.

Home monitoring system 106, using the sensors, can collect vehicle location data 114 related to one or more vehicles 110 associated with the home 104, user location data 116 related to one or more users 108 associated with the home 104, and home settings data 118 related to a set of settings (e.g., climate control settings) for home 104. Vehicle location data 114 can include a location of a vehicle 110 relative to home 104 (e.g., "at home" or "away"), location data (e.g., GPS data) from an onboard computer of the vehicle 110 or a mobile device of the driver of the vehicle 110. User location data 116 can include location of the users 108 associated with home 104, where a user 108 can be an e.g., a resident, visitor, or worker at the home 104. The user location 116 can include information about a location of a user (e.g., the user 108 is at home 104 or the user 108 is not at home 104), and a particular user 108 left the home 104 in a particular vehicle 110. For example, Driver A may be detected by the home monitoring system 106 leaving the home 104 inside Vehicle B, and the home monitoring system 106 stores this information in the user location data 116 and/or vehicle location data 114. In another example, Driver C and Driver D may be detected by the home monitoring system 106 leaving the home 104 inside Vehicle E, and the home monitoring system 108 stores this information in the driver location data 114 and/or user location data 116.

The climate control event 101 in Stage (A) can include determining that a user 108 is leaving home 104 and entering vehicle 110. Determining that a climate control event is occurring can include pattern recognition based on a user's 108 routine. For example, a user 108 can be leaving the home 104 in the morning (e.g., 8:00 AM departure time) and taking their vehicle 110 to work. Determining that a climate control event is occurring can include using one or more calendars for the user 108. For example, a user's calendar can indicate an upcoming scheduled meeting at a different location than home 104 such that the user 108 will require driving their vehicle 110 to the meeting. Determining that a climate control event is occurring can include monitoring the home settings 118. For example, a user 108 may alter a state of the thermostat, lights, or other settings in the home 104 in preparation for departing the home 104.

The home monitoring system 106 can communicate through a network 120 with the climate control system 102. Network 120 can be configured to enable exchange of electronic communication between devices connected to the network 120. The network 120 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL), radio, television, cable, satellite, or any other delivery or tunneling mechanism for carrying data. Network 120 may include multiple networks or subnetworks, each of which may include, for example, a wired or wireless data pathway. Network 120 may include a circuit-switched network, a packet-switched data network, or any other network able to carry electronic communications (e.g., data or voice communications). For example, network 120 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. Network 120 may include one or more networks that include wireless data channels and wireless voice channels. Network 120 may be a wireless network, a broadband network, or a combination of networks includes a wireless network and a broadband network.

In stage (B) one or more user devices 122 can communicate with the climate control system 102 and the home monitoring system 106 through the network 120. The one or more user devices 122 may include devices that host and user application 124 including an application environment. For example, a user device 122 is a mobile device that hosts one or more native applications (e.g., application 124) that includes an application interface (e.g., a graphical-user interface (GUI)) through which a user of the user device 122 may interact with the climate control system 102 and/or the home monitoring system 106. The user device 122 may be a cellular phone or a non-cellular locally networked device with a display. The user device 122 may include a cell phone, a smart phone, a tablet PC, a personal digital assistant ("PDA"), or any other portable device configured to communicate over a network and display information. For example, implementations may also include BLACKBERRY®-type devices (e.g., smart phones as provided by Research in Motion RESEARCH IN MOTION"), electronic organizers, tablets (e.g., IPAD® as provided by APPLE® or SURFACE® as provided by MICROSOFT®), iPhone IPHONE-type devices (e.g., smart phones as provided by APPLE®), IPOD® devices (e.g., portable media players as provided by APPLE®) or other portable music players, other communication devices, and handheld or portable electronic devices for gaming, communications, and/or data organization. The user device 122 may perform functions unrelated to the climate control system 102, such as placing personal telephone calls, playing music, playing video, displaying pictures, browsing the Internet, maintaining an electronic calendar, etc.

Application 124 refers to a software/firmware program running on the corresponding mobile device that enables the user interface and features described throughout, and is a system through which the climate control system 102 may communicate with the user 108. The user device 122 may load or install the application 124 based on data received over a network or data received from local media. The application 124 runs on mobile devices platforms, such as IPHONE, IPOD TOUCH®, BLACKBERRY®, GOOGLE ANDROID, WINDOWS MOBILE®, etc. The application 124 enables the user device 122 to modify, accept, or decline climate control settings for vehicle 110 and home 104. The one or more user devices 122 may receive the data from the climate control system 102 through the network 120.

In some implementations, the application 124 is a part of a home monitoring application for the home monitoring system 106. For example, a user 108 of a user device 122 may receive alerts through an application 124 that are related to the climate control system 102 and notifications from the home monitoring system 106 that are related to home monitoring (e.g., home security).

In some implementations, user device 122 may be a general-purpose computer (e.g., a desktop personal computer, a workstation, or a laptop computer) that is configured to communicate with the climate control system 102 over the network 120. The user device 122 may be configured to display an application interface that is generated by the user device 122 or by the climate control system 102. For example, the user device 122 may be configured to display a user interface (e.g., a web page) provided by the climate control system 102 that enables a user to input climate control preferences and modify climate control settings through the climate control system 102.

In stage (B), the climate control system 102 can receive user input 126 from user 108 related to the climate control event 101. User input 126 can be provided by a user 108 through an application environment of the application 124 on a user device 122. User input 126 can be user climate control preferences (e.g., temperature settings, vent settings, and the like). For example, a user 108 can set a preference for running the air conditioning in the vehicle 110 at 68° F. with only the vents that face the floor at a medium fan speed. In another example, a user 108 can specify that for ambient temperatures between 65-80° F. the windows should be open in the vehicle 110 and the HVAC system should be off (e.g., not be actively cooling or heating the vehicle 110).

In some implementations, user input 126 can be responsive to a request by the climate control system 102 for verification of one or more climate control settings. For example, the climate controls system 102 may request a user confirmation of a set of climate control settings to send to vehicle 110 when a climate control event 101 (e.g., user 108 is leaving home 104 and entering vehicle 110) is determined. In another example, the climate control system 102 may request for user confirmation of several sets of climate control settings (e.g., for different vehicles, or different drivers of a vehicle) during a set-up process of the climate control system 102.

In some implementations, information about energy usage for particular climate control settings (e.g., how much fuel could be consumed by the vehicle, or electric/natural gas costs (e.g., price per kWh) for operating the home 104 HVAC system) can be provided to user 108 to assist the user in making a more educated decision as to whether they want the climate control settings to be applied to the vehicle 110 and/or home 104, or whether they want to provide user feedback 126 to have an adjustment made to the climate control settings.

In stage (C), the climate control system 102 determines, based on the climate control event 101, to set vehicle 110 climate control settings (e.g., temperature settings) (128).

The climate control system 102 can receive, from the home monitoring system 106, a set of current home settings 118 including a set of climate control settings (130). The set of current home settings 118 can include ambient temperature of one or more rooms of the home 104, occupancy of respective rooms of the home 104, open/closed windows, fan operation, lights settings, and the like. The climate control system 102 can additionally receive information about the user 108, the vehicle 110, for example, user preferences for a particular user 108, vehicle configuration (e.g., vents in a backseat or no vents in a backseat).

In some implementations, user location data 116 can be used to determine which users 108 are associated with respective vehicles 110 for the climate control event 101. For example, user location data 116 can use camera and sensor data from the home monitoring system 106 to identify a particular user "Jane" as the user 108 triggering a climate control event when Jane is determined to be exiting a front door of home 104 and entering a particular vehicle (e.g., "Jane's car") in the driveway. Further details about the selection of current home settings can be found below with reference to FIG. 4.

The climate control system 102 can receive user feedback from a user 108, for example, through an application 124 on a user device 122 (132). For example, a user 108 "Jane" might provide feedback to the climate controls system 102 through an application on her mobile phone. In one example, the user feedback can be Jane overriding or modifying the preset climate control settings for her vehicle 110, e.g., to open the windows rather than run the A/C unit. In another example, the user feedback can be to confirm the automatic climate control settings selected by the climate control system 102. In yet another example, the user 108 may choose not to provide feedback to the climate control system 102.

The climate control system 102 provides instructions including a set of climate control settings to vehicle 110 (134). The instructions can be provided to the onboard control unit 112 of the vehicle 110, for example, over a wireless communications line (e.g., Wi-Fi, BLUETOOTH® satellite data, etc.). Instructions can include temperature settings, air vent location and fan speed, window settings (e.g., open vs closed), and the like.

In some implementations, instructions can be provided to the onboard control unit 112 prior to the user 108 entering the vehicle 110. In one example, instructions can be provided to the vehicle 108 at a set period of time prior to the user 108 departing from home 104 and entering vehicle 110 (e.g., 5 minutes, 10 minutes, or the like). In another example, instructions can be provided to the vehicle 110 upon an indication by a user 108 (e.g., a user 108 sends instructions through the user application 124 on the user's device 122).

In stage (D), the onboard control unit 112 receives a set of climate control settings from the climate control system 102 via a wireless communication link 136. In some implementations, a wireless communication link 136 can be enabled through a global system for mobile communications (GSM) module that is connected to a controller area network (CAN) bus 138 for the vehicle 110. The CAN bus 138 can control operations of one or more features of the vehicle 110 (e.g., HVAC, auto start/stop, electric park brakes, parking assist systems, transmission, airbags, antilock brakes, audio systems, etc.).

The CAN bus 138 can provide the instructions from the climate control system 102 to the HVAC system 140, to set the particular climate control settings as determined by the climate control system 102. For example, the CAN bus 138 can send instructions to set a particular temperature, particular vent settings, and fan speeds to the HVAC system 140 based on the climate control settings (e.g., 75° F. ambient temperature setting, windows rolled up, only driver's side vents active) that were provided by the climate control system 102.

Figure 2:
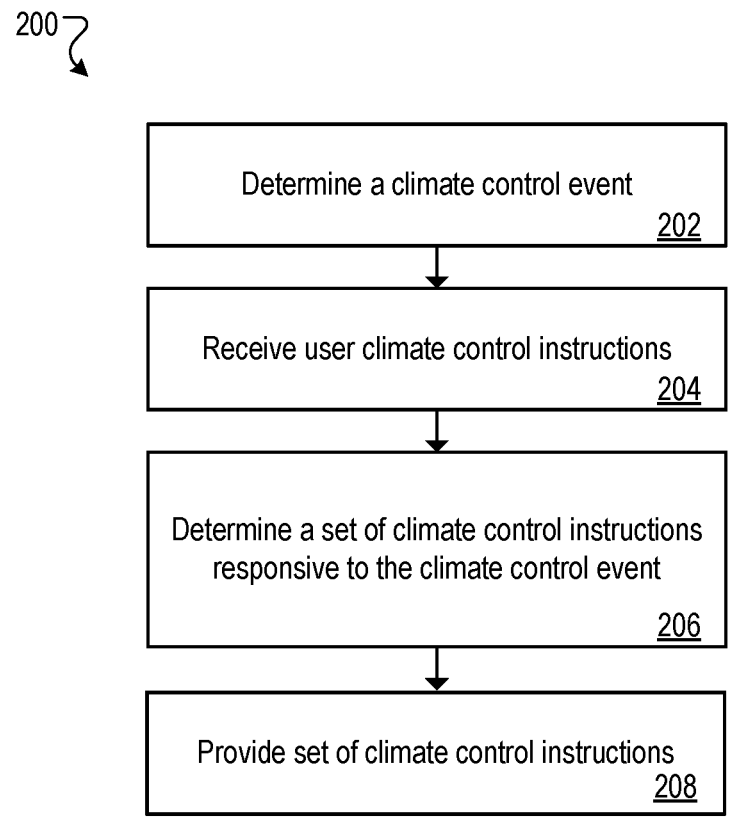
FIG. 2 is a process flow diagram of an example process for automated climate control.

FIG. 2 is a process flow diagram of an example process 200 for automated climate control. A climate control event 101 is determined (202). In general, a climate control event 101 can be an instance of when a user 108 is moving from one climate-controlled environment to a second, different climate-controlled environment, e.g., house 104 to vehicle 110, or vice versa. A climate control event 101 can be a scheduled event, where a user 108 has a particular routine (e.g., leave the house at 8 AM every weekday morning). A climate control event 101 can be an unscheduled event, where a user 108 can be determined to be moving between one climate controlled environment and a second climate controlled environment by one or more sensors or cameras of the home monitoring system 106 and/or location-based data from a vehicle 110 (e.g., GPS data).

In some implementations, climate control event 101 can be a determination, e.g., by the home monitoring system 106, that a user 108 is departing home 104 and entering a vehicle 110. Climate control event 101 can be a determination that a vehicle 110 has arrived at home 104 and that a user 108 inside the vehicle 110 is exiting the vehicle 110 and entering the home 104.

In some implementations, user climate control instructions are received (204). A user 108 can indicate a set of climate control preferences for home 104 and/or vehicle 110, for example, temperature preferences, vent arrangement, fan speed, window positioning, etc. The user 108 can set user climate control instructions through an application 124 on a user device 122 (e.g., a mobile device). User climate control instructions can be in the form of a user selection of a "accept", "modify", or "decline" of a set of climate control instructions provided through application 124 on the user's mobile device 122. User climate control instructions can be in the form of speech-to-text, text-based or other form of instructions that are processed, for example, by using natural language processing (NLP) by the climate control system 102. For example, a user 108 can provide instructions "Set temperature to 75 degrees and turn on the fan in the living room" or "Run car A/C on full blast" through application 124 which can be converted into user climate control instructions and provided to the climate control system 102.

In some implementations, the user 108 can choose to not provide feedback, e.g., indicate through application 124 that the user 108 does not want to provide user climate control instructions. The user 108 can choose to accept a set of climate control settings provided by the climate control system 102, for example, by passively accepting (e.g., no user interaction) or by actively accepting (e.g., selecting an "accept" function in the application 124).

In some implementations, a user 108 may receive a query regarding a current set of climate control settings for a home 104 or vehicle 110 based on a relative location of the user 108 to home 104 or vehicle 110. For example, the climate control system 102 may query a user 108 for climate control settings when the user is determined to be entering home 104 or vehicle 110 (e.g., to confirm or modify a set of climate control settings).

A set of climate control instructions are determined that are responsive to the climate control event (206). The set of climate control instructions, when provided, include a set of commands to the receiving system (e.g., home monitoring system 106 or HVAC system 140) that program the receiving system and respective devices to the set of climate control settings. For example, the set of climate control instructions to provide to home 104 e.g., to the home monitoring system 106 that controls a home HVAC system, includes a set of commands to the home monitoring system 106 and a set of devices in the home 104 (e.g., thermostat, fans, etc.).

The climate control system 102 can receive one or more home settings 118 from a home monitoring system 106 that include information about climate control in home 104, and can receive climate control instructions from a user 108. The climate control system 102 can determine a respective ranking of each climate control settings based on, for example, a source of the settings (e.g., from a user 108, from home settings 118, or the like). In one example, climate control settings received from user 108 override any contrary settings determined by the climate control system 102. In another example, the climate control system 102 may perform one or more operations to find an appropriate set of climate control settings from all received sets of climate control settings. Further details are described below with reference to FIG. 5.

The set of climate control instructions are provided (208). In some implementations, the set of climate control instructions are provided to an onboard control unit 112 of vehicle 110. The set of climate control instructions provided to the onboard control unit 112 may specify one or more climate control settings for the vehicle 110 including, for example, a temperature setting for the HVAC system, window positions (e.g., open or closed), fan speed, seat heating, or the like.

In some implementations, the set of climate control instructions are provided to a home monitoring system 106 for home 104, where the set of climate control instructions may specify one or more climate control settings for the home 104 including, for example, a temperature setting for the HVAC system, fan operation in one or more rooms, window positions (e.g., open or closed), or the like.

In some implementations, multiple sets of climate control instructions are provided to a respective home monitoring system 106 for home 104 and to at least one onboard control unit 112 for a vehicle 110. Multiple different vehicles 110 can receive respective sets of climate control instructions which may be different from each other set of climate control instructions, e.g., customized for each respective driver of each vehicle 110.

In some implementations, the climate control system 102 can receive a set of climate control settings from a vehicle 110 and determine a set of climate control settings to provide to a home monitoring system 106 for a home 104. A status is provided to the climate control system 102 by an onboard control unit of a vehicle 110. A status can be a current location of the vehicle 110 relative to the home 104, a set of climate control settings for the vehicle 110, or the like.

Figure 3:
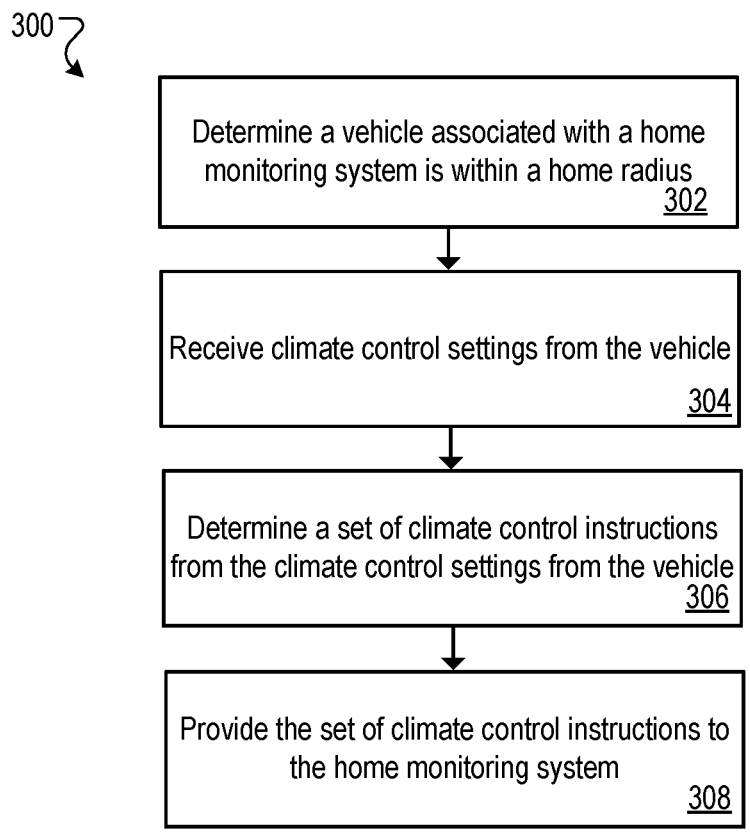
FIG. 3 is a process flow diagram of another example process for automated climate control

FIG. 3 is a process flow diagram of another example process 300 for automated climate control. A vehicle 110 associated with a home 104 is determined by the home monitoring system 106 to be within a home radius (302). A vehicle 110 associated with home 104 can be a vehicle 110 that is owned by a resident of the home 104, a vehicle 110 that is owned by an employee or frequent visitor to home 104 (e.g., a nanny, a delivery person, etc.), or a vehicle 110 that is designated by an owner of home 104 (e.g., through the home monitoring system 106) as an associated vehicle 104 (e.g., a friend or relative's vehicle is an "authorized" vehicle).

A home radius is an area surrounding the home 104 location, e.g., a 5 mile radius. A vehicle 110 that enters the home radius can be determined to be arriving at the home 104, which can trigger a climate control event 101. The home radius can be determined using location-tracking services, and can be set by a user 108 of home 104. In one example, the home radius is a GeoFence with a center in or around a home 104 and a particular radius defined by a user 108. The home radius can be configured on the customer site or mobile application (e.g., application 124). A default home radius can be created where a security system for the home 104 is located, e.g., using the home monitoring system 106.

In some implementations, a home radius can be created in a backend server for the climate control system 102 and which is periodically passed to the user device 122 so it has the latest information about the coordinate and radius, allowing application 124 (e.g., an Alarm.com customer app) to notify the backend server at the climate control system 102 of vehicles 110 crossing the home radius.

Climate control settings are received from the vehicle 110 (304). A set of climate control settings from the vehicle 110 can be received by the climate control system 102, where an onboard control unit 112 for vehicle 110 is in data communication (e.g., through wireless communication link 136) with the climate control system 102.

A set of climate control instructions are determined, e.g., for the home 104, from the climate control settings from the vehicle 110 (306). The set of climate control instructions for the home 104 can be determined based on one or more current climate control settings for the vehicle 110. For example, a climate control setting for the vehicle 110 can be a temperature setting for the HVAC system 140 of 75° F. In another example, a climate control setting for the vehicle 110 is that all of the windows of the vehicle 110 are open.

In some implementations, the set of climate control instructions for the home 104 from the current set of climate control settings for the vehicle 110 are determined such that the set of climate control instructions will set the climate control in the home 104 based on the climate control of the vehicle 104. In one example, the climate control in the home 104 is set to match the climate control in the vehicle, e.g., if the vehicle 110 temperature setting is 75° F., an HVAC system for the home 104 is set to achieve a same temperature of 75° F.

In some implementations, the climate control in the home 104 is scaled by an adjustment factor with respect to the climate control in the vehicle 110. The adjustment factor is a conversion to translate a climate control setting for a vehicle 110 into to a climate control setting for a home 104, and vice versa. The adjustment factor can be a number of degrees difference, a fan speed difference, or the like that is applied to a climate control setting for the home 104 to translate the climate control setting to a corresponding vehicle 110 climate control setting, and vice versa. For example, the vehicle 110 is set at a first temperature setting, and the home 104 is set at a second temperature setting that is a number of degrees offset (e.g., 5 degrees cooler, 2 degrees warmer) from the first temperature setting. In another example, the vehicle 110 has a driver's side window open, and the home 104 is set to have two kitchen windows open in a corresponding, adjusted climate control setting. In yet another example, the vehicle has a fan speed set to medium, and the home 104 has a fan in a recreation room operating on a low speed in a corresponding, adjusted climate control setting.

In some implementations, the adjustment factor can be different based on real-time, external factors, where the adjustment factor can be different depending on a particular set of factors and can be modified in real-time (e.g., by the climate control system 102) to account for the set of factors. The set of factors can include, for example, the weather outside, the position of the sun relative to home 104 and vehicle 110, time of day, the year/make/model of the particular vehicle 110 (e.g., an older passenger van vs. a new, efficient two-door coupe), and the like. For example, on a sunny day when vehicle 110 is in direct sunlight, the adjustment factor may translate a climate control setting for a home 104 into a climate control setting for a vehicle 110 by a first adjustment factor (e.g., a 5 degree temperature difference); and on a cool day when there is cloud cover and no direct sunlight on vehicle 110, the adjustment factor may translate a climate control setting for a home 104 into a climate control setting for the vehicle 110 by a second, different adjustment factor (e.g., a 1 degree temperature difference). In another example, if the user 108 is entering a particular vehicle 110 that is an older, larger vehicle (e.g., a ten-year old minivan), the climate control settings from home 104 may be adjusted by a first adjustment factor (e.g., 10 degrees, fans on full speed), versus if the user 108 is entering a different vehicle 110 that is a small two-door coupe with newer HVAC, e.g., the adjustment factor may be 2 degrees, fans on medium speed.

In some implementations, the adjustment factor can be based on a current fuel level of vehicle 110 or a current cost of electricity and/or natural gas for a home 104 HVAC system. For example, if a gas tank for vehicle 110 is close to being empty, the adjustment factor may adjust the climate control settings to be less fuel intensive. In another example, if the cost of electricity is within a surge range (e.g., above a set price per kWh), then the adjustment factor can adjust the climate control settings to be less energy intensive.

The set of climate control instructions are provided to the home monitoring system 106 (308). The climate control system 102 can provide the set of climate control instructions to the home monitoring system 106 for home 104, where the home monitoring system 106 can provide instructions to the respective devices and operations of the home 104 (e.g., setting a temperature on the A/C unit, opening/closing windows, turning on/off fans, etc.). The home monitoring system 106 can be in data communication with the climate control system 102 over the network 120. In some implementations, the climate control system 102 is a part of the home monitoring system 106 for home 104.

Figure 4:
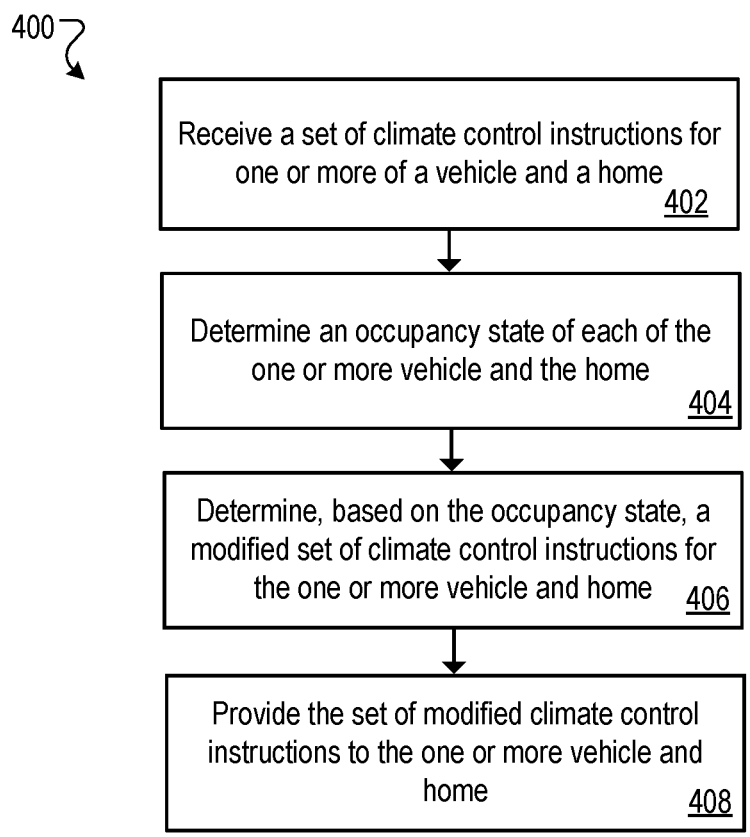
FIG. 4 is a process flow diagram of another example process for automated climate control.

In some implementations, a climate control event 101 can indicate a user 108 exiting a home 104 and entering a vehicle 110 and vice versa, where the home 104 or the vehicle 110 may have other occupants (e.g., other users 108) that may affect the climate control instructions provided to the home 104 or vehicle 110. FIG. 4 is a process flow diagram of another example process 400 for automated climate control. A set of climate control instructions are received for one or more of a vehicle 110 and a home 104 (402). The climate control system 102 can determine a set of climate control instructions responsive to a climate control event 101, as described in more detail above with reference to FIGS. 1-3.

An occupancy state of each of the vehicle 110 and home 104 is determined (404). User location data 114 and vehicle location data 116, e.g., where residents and drivers are located at any given time, can be used to determine occupancy of home 104 and vehicle 110. The home monitoring system 106 may track user 108 location throughout a home 104 (e.g., a current room of occupancy) using various sensors and cameras positions in and around home 104. For example, the home monitoring system 106 can use video feeds from cameras located in and outside home 104 to track a user 108 location using, e.g., a machine-learned model for identifying and tracking a particular user 108. In another example, the home monitoring system 106 can use data from appliances (e.g., a coffee pot, a treadmill, a stereo system, etc.) that are in data communication with the home monitoring system 106 to infer a user's location in home 104, based on an activity level of appliances in a particular room.

Based on the occupancy state of the vehicle 110 and home 104, a modified set of climate control instructions are determined for the vehicles 110 and home 104 (406). The climate control system 102 can modify one or more of the set of climate control instructions based in part on a determined occupancy (e.g., how many users 108 are determined to be present) of the vehicle 110 and home 104.

In some implementations, the climate control system 102 can modify the set of climate control instructions that are responsive to a climate control event 101 that is a vehicle 110 arriving at home 104, based in part on a determined occupancy of vehicle 110 of two or more users 108 that are arriving at home 104. For example, a vehicle 110 can be occupied by two different users 108 (e.g., a driver and a passenger), where the two users 108 may have different climate control preferences for home 104 (e.g., the driver likes to have home 104 A/C temperature set at 75° F., and the passenger likes to have home 104 A/C temperature set at 68° F.). A modified set of climate control instructions can be, for example, an adjusted temperature setting for home 104 based on the combined preferences (e.g., an average of temperatures) of both the driver and the passenger.

In some implementations, the climate control system 102 can modify the set of climate control instructions that are responsive to a climate control event 101 that is a vehicle 110 arriving at home 104, based in part on a determined occupancy of home 104 before the vehicle 110 arrives at home 104. For example, a home 104 can have a current occupant when vehicle 110 arrives at home 104 with a driver. The climate control system 102 can determine a modified set of climate control instructions (e.g., do not change current climate control settings, change one or more climate control settings, or change all climate control settings) based on the climate control settings of vehicle 110 and/or user preferences for the driver of vehicle 110.

In some implementations, the climate control system 102 can modify the set of climate control instructions that are responsive to a climate control event 101 that is a user 108 departing home 104 and entering vehicle 110, based on a number of users 108 (e.g., two or more) that are departing home 104 and entering vehicle 110. For example, the set of climate control instructions provided to vehicle 110 responsive to the climate control event 101 can be modified to account for the user preferences of all of the users 108 that will be entering vehicle 110 (e.g., a driver and a passenger).

In some implementations, multiple climate control events 101 can be determined to occur within a period of time (e.g., within 10 minutes of each other) such that the climate control settings for one or more vehicles 110 and home 104 are adjusted based on the multiple climate control events 101. For example, two different users 108 can be determined to be arriving to home 104 within a period of 15 minutes of each other, such that the set of climate control settings provided to home 104 by the climate control system 102 account for the respective climate control settings for the vehicles 110 of each of the two users 108 and the user preferences of each of the two users 108.

In some implementations, two different users 108 can be determined to be arriving to home 104, where each user 108 is in a respective vehicle 110 at a respective distance from home 104 (e.g., 5 miles away, 15 miles away). A set of climate control settings provided to home 104 by the climate control system 102 can account for the respective climate control settings for the vehicles 110 of each of the two users 108, the user preferences of each of the two users 108, and the respective distances of each of the vehicles 110 from home 104, e.g., biasing the temperature to the closer user 108.

The climate control system 102 can modify the set of climate control instructions that are responsive to a climate control event 101 that is a first user 108 arriving at home 104, based on a number of other users 108 (e.g., at least one other second user 108) that are arriving at the home 104 from respective vehicles 110 within a same period of time as the first user 108. For example, two different drivers in two different respective vehicles may be arriving to home 104 within a period of time (e.g., within 10 minutes, within 1 hour, etc.) of each other. The climate control system 102 can modify the set of climate control instructions for the home 104 to include climate control settings that are responsive to climate control settings of each of the two vehicles 110 and user preferences of each of the two drivers.

In some implementations, the climate control system 102 can modify the set of climate control instructions that are responsive to the climate control event 101 based on receiving changes to the climate control instructions by a user 108. For example, a user 108 may decide to change the set of climate control preferences for the home 104 (e.g., "turn the heat up to 70° F.") such that a modified set of instructions is generated by the climate control system to include an updated thermostat setting (e.g., "set the thermostat to 70° F.").

The set of modified climate control instructions are provided to the vehicles 110 and home 104 (408). The set of modified climate control instructions can be provided, for example, to an onboard control unit 112 for a vehicle 110, or to a home monitoring system 106 for home 104. Further details about providing instructions to a vehicle 110 or home 104 are described above with reference to FIGS. 1-2.

Figure 5:
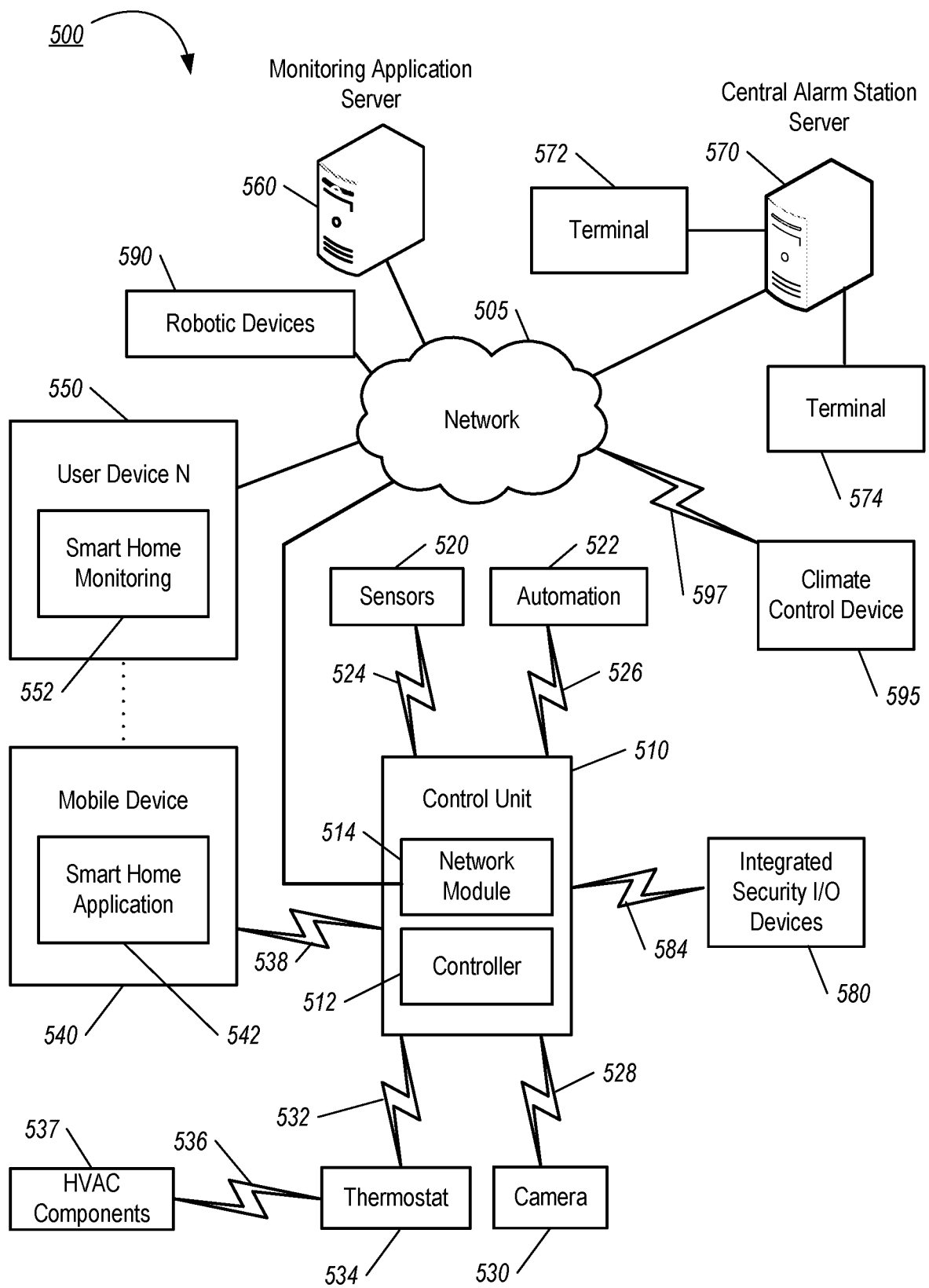
FIG. 5 shows a diagram illustrating an example home monitoring system.

FIG. 5 is a diagram illustrating an example of a home monitoring system 500. The electronic system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510. The thermostat 534 can receive climate control instructions for a set of climate control settings from climate control system 102 over the network 120. The thermostat 534 can provide a current set of climate control settings for the home (e.g., home 104) to the climate control system 102 to generate a set of climate control instructions for a vehicle (e.g., vehicle 110).

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as BLUETOOTH R BLUETOOTH LE®, Z-WAVE®, ZIGBEE®, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The system 500 further includes a climate control device 595 (e.g., a CAN bus 138 and a wireless communication link 136) for a vehicle (e.g., vehicle 110) in communication with the network 505 (e.g., network 120) through a communication link 597 (e.g., wireless communication link 136). The climate control device 595 can include any type of device used to control climate control settings in a vehicle (e.g., HVAC system 140). The climate control device 595 can additionally control a number of other functions for a vehicle including, for example, auto start/stop, electric park brakes, parking assist systems, transmission, airbags, antilock brakes, audio systems, etc.

In some implementations, a climate control system (e.g., climate control system 102) can be implemented on monitoring server application 560, as a part of the home monitoring system (e.g., home monitoring system 106). In some implementations, the climate control system 102 can be implemented on a separate server from the monitoring application server 560.

The sensors 520, the home automation controls 522, the camera 530, the thermostat 534, and the integrated security devices 580 may communicate with the controller 512 over communication links 524, 526, 528, 532, 536, 538, and 584. The communication links 524, 526, 528, 532, 536, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 536, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-WAVER, ZIGBEE®, BLUETOOTH®, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events (e.g., climate control events 101) generated by the control unit 510. In this example, the monitoring server 560 may exchange electronic communications with the network module 514 included in the control unit 510 to receive information regarding events (e.g., climate control events 101) detected by the control unit 510. The monitoring server 560 also may receive information regarding events (e.g., climate control events 101) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., user 108). For example, one or more of the sensors 520, the home automation controls 522, the camera 530, the thermostat 534, and the integrated security devices 580 can collect data related to a resident including location information (e.g., if the resident is home or is not home) and provide location information to the climate control system 102 for the resident.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include BLACKBERRY®-type devices (e.g., as provided by RESEARCH IN MOTION® electronic organizers, IPHONE®-type devices (e.g., smart phones as provided by APPLE®), IPOD® devices (e.g., portable media players as provided by APPLE®) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The smart home monitoring application 542 refers to a software/firmware program running on the corresponding mobile device that enables the user interface and features described throughout. The mobile device 540 may load or install the home monitoring application 542 based on data received over a network or data received from local media. The home monitoring application 542 runs on mobile devices platforms, such as IPHONE®, IPOD TOUCH®, BLACKBERRY®, GOOGLE ANDROID®, WINDOWS MOBILE®, etc. The home monitoring application 542 enables the user device 540 to receive and process image and sensor data from the monitoring system.

The mobile device 540 may be a general-purpose computer (e.g., a desktop personal computer, a workstation, or a laptop computer) that is configured to communicate with the monitoring server 560 and/or the control unit 510 over the network 505. The mobile device 540 may be configured to display a smart home user interface 552 that is generated by the mobile device 540 or generated by the monitoring server 560. For example, the mobile device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, BLUETOOTH®, Z-WAVE®, ZIGBEE®, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring application server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
setting a first climate control setting for a first zone using a second climate control setting for a second zone and an adjustment factor;
detecting a change to a climate control setting for the first zone;
receiving, by a first control unit for the first zone and from a second control unit for the second zone, data that reflects a status of the second zone;
determining whether the data that reflects the status of the second zone was received within a particular period of time from detecting the change to the climate control setting for the first zone and an updated adjustment factor should be determined instead of determining to skip updating the adjustment factor;
in response to determining that the data that reflects the status of the second zone was received within the particular period and to not determine to skip updating the adjustment factor, determining an updated adjustment factor using the change to the climate control setting for the first zone, the data that reflects the status of the second zone that was received within the particular period of time from detecting the change to the climate control setting for the first zone, and the adjustment factor; and
setting, for the first zone, an updated climate control setting using the updated adjustment factor that was determined using the change to the climate control setting for the first zone, the data that reflects the status of the second zone that was received within the particular period of time from detecting the change to the climate control setting for the first zone, and the adjustment factor.

2. The method of claim 1, wherein determining the updated adjustment factor comprises determining the updated adjustment factor using one or more of a current weather, a temperature offset, or a vehicle fan speed adjustment.

3. The method of claim 1, wherein detecting the change to the climate control setting for the first zone comprises detecting a second change to the second climate control setting for the second zone.

4. The method of claim 1, wherein detecting the change to the climate control setting for the first zone comprises:

detecting, using calendar data for a person associated with the first zone, a scheduled event; and in response to detecting the scheduled event, changing the climate control setting for the first zone.

5. The method of claim 1, wherein detecting the change to the climate control setting for the first zone comprises:
detecting an unscheduled event in the first zone; and
in response to detecting the unscheduled event in the first zone, changing the climate control setting.

6. The method of claim 5, wherein detecting the unscheduled event comprises:
receiving camera data for the first zone; and
detecting, using the camera data, an arrival or a departure of a person.

7. The method of claim 1, wherein setting the updated climate control setting comprises one or more of, for the first zone, opening a window, adjusting a fan speed, or adjusting a temperature.

8. The method of claim 1, wherein determining the updated adjustment factor comprises determining the updated adjustment factor using one or more of a power level for the first zone, or a power level for the second zone.

9. The method of claim 1, wherein detecting the change to the climate control setting for the first zone comprises receiving, from an indoor climate control device, data indicating a user adjustment to the climate control climate setting.

10. The method of claim 1, wherein:
the second zone comprises a zone in a vehicle and the first zone comprises a zone in a property; and
setting the updated climate control setting comprises setting the updated climate control setting for the zone in the vehicle using the updated adjustment factor determined using the change to the second climate control setting for the zone in the property.

11. A system comprising one or more computers and one or more storage devices on which are stored instructions that are operable, when executed by the one or more computers, to cause the one or more computers to perform operations comprising:
setting a first climate control setting for a first zone using a second climate control setting for a second zone and an adjustment factor;
detecting a change to a climate control setting for the first zone in the first and second zones;
receiving, by a first control unit for the first zone and from a second control unit for the second zone, data that reflects a status of the second zone;
determining whether the data that reflects the status of the second zone was received within a particular period of time from detecting the change to the climate control setting for the first zone and an updated adjustment factor should be determined instead of determining to skip updating the adjustment factor;
in response to determining that the data that reflects the status of the second zone was received within the particular period and to not determine to skip updating the adjustment factor, determining an updated adjustment factor using the change to the climate control setting for the first zone, the data that reflects the status of the second zone that was received within the particular period of time from detecting the change to the climate control setting for the first zone, and the adjustment factor; and
setting, for the first zone, an updated climate control setting using the updated adjustment factor that was determined using the change to the climate control setting for the first zone, the data that reflects the status of the second zone that was received within the particular period of time from detecting the change to the climate control setting for the first zone, and the adjustment factor.

12. The system of claim 11, wherein determining the updated adjustment factor comprises determining the updated adjustment factor using a current weather, a temperature offset, and a vehicle fan speed adjustment.

13. The system of claim 11, wherein detecting the change to the climate control setting for the first zone comprises detecting a second change to the second climate control setting for the second zone.

14. The system of claim 11, wherein detecting the change to the climate control setting for the first zone comprises:
detecting, using calendar data for a person associated with the first zone, a scheduled event; and
in response to detecting the scheduled event, changing the climate control setting for the first zone.

15. The system of claim 11, wherein detecting the change to the climate control setting for the first zone comprises:
detecting an unscheduled event in the first zone; and
in response to detecting the unscheduled event in the first zone, changing the climate control setting.

16. The system of claim 15, wherein detecting the unscheduled event comprises:
receiving camera data for the first zone; and
detecting, using the camera data, an arrival or a departure of a person.

17. The system of claim 11, wherein setting the updated climate control setting comprises one or more of, for the first zone, opening a window, adjusting a fan speed, or adjusting a temperature.

18. The system of claim 11, wherein determining the updated adjustment factor comprises determining the updated adjustment factor using one or more of a power level for the first zone, or a power level for the second zone.

19. The system of claim 11, wherein detecting the change to the climate control setting for the first zone comprises receiving, from an indoor climate control device, data indicating a user adjustment to the climate control climate setting.

20. A non-transitory computer storage medium encoded with instructions that, when executed by one or more computers, cause the one or more computers to perform operations comprising:
setting a first climate control setting for a first zone using a second climate control setting for a second zone and an adjustment factor;
detecting a change to a climate control setting for the first zone in the first and second zones;
receiving, by a first control unit for the first zone and from a second control unit for the second zone, data that reflects a status of the second zone;
determining whether the data that reflects the status of the second zone was received within a particular period of time from detecting the change to the climate control setting for the first zone and an updated adjustment factor should be determined instead of determining to skip updating the adjustment factor;
in response to determining that the data that reflects the status of the second zone was received within the particular period and to not determine to skip updating the adjustment factor, determining an updated adjustment factor using the change to the climate control setting for the first zone, the data that reflects the status of the second zone that was received within the particular period of time from detecting the change to the climate control setting for the first zone, and the adjustment factor; and setting, for the first zone, an updated climate control setting using the updated adjustment factor that was determined using the change to the climate control setting for the first zone, the data that reflects the status of the second zone that was received within the particular period of time from detecting the change to the climate control setting for the first zone, and the adjustment factor.

* * * * *